Figure 1:
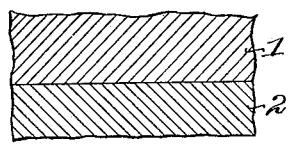

No. 682,913. Patented Sept. 17, 1901.
G. D. COLEMAN.
ANTIFOULING COATING.
(Application filed Dec. 31, 1900.)

(No Model.)

1 — metal plate
2 — paint
3 — mineral insulating material
— copper

Witnesses:
John F. C. Prinkeeth
Horace Van Everen

Inventor:
George D. Coleman
by his Attorney
Benjamin Phillips

UNITED STATES PATENT OFFICE.

GEORGE D. COLEMAN, OF BOSTON, MASSACHUSETTS.

ANTIFOULING COATING.

SPECIFICATION forming part of Letters Patent No. 682,913, dated September 17, 1901.

Application filed December 31, 1900. Serial No. 41,656. (No model.)

*To all whom it may concern:*

Be it known that I, GEORGE D. COLEMAN, a citizen of the United States, residing at Boston, in the county of Suffolk and State of Massachusetts, have invented certain new and useful Improvements in an Antifouling Coating for Metal Structures; and I do hereby declare the following to be a full, clear, and exact description of the invention, such as will enable others skilled in the art to which it appertains to make and use the same.

The present invention relates to an improved antifouling coating for metal structures intended to be submerged in or exposed to the action of water and more particularly sea-water—such, for example, as the bottoms of iron or steel vessels, iron or steel work on bridges, piers, docks, caissons, lighthouses, or other metal structures the whole or parts of which are submerged in or exposed to the action of water.

The object of the present invention is to prevent the deterioration and corrosion of such metal structures and the accumulation of marine growths thereon.

In the patent granted to me July 25, 1899, No. 629,426, I described and claimed an antifouling coating for metal structures which is composed of a layer of paint applied to the surface of the metal to be protected, a layer of comminuted soft metal, such as lead, embedded in the layer of paint, and a layer of comminuted copper embedded in the layer of soft metal, presenting a smooth surface closely studded with bare particles of copper. The coating when exposed to the action of moisture prevents corrosion of the structure, and the slow decomposition of the copper surface prevents the accumulation of marine growths thereon. The coating described in my said patent is expensive, the ingredient of soft metal making the cost of the coating very considerable. Furthermore, I have found it to be desirable in some cases to interpose between the layer of copper and the metal to be covered a material which shall not only act to prevent the accidental contact of the copper with the metal, but which shall also constitute an insulating layer thoroughly to separate the copper and the metal to be covered.

To the above end the present invention consists in the antifouling coating for metal structures hereinafter described and claimed, in which the active ingredient is pulverized, granulated, or comminuted copper, which is securely attached to the surface of the metal to be covered by a layer of paint and separated therefrom by a layer of insulating material, whereby the danger of electrolytic action between the copper and the metal to be covered is diminished.

The accompanying drawings illustrate diagrammatically the preferred form of my improved antifouling coating and the successive steps of a method of making the same.

Figure 3:
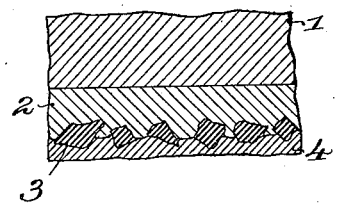
Figure 4:
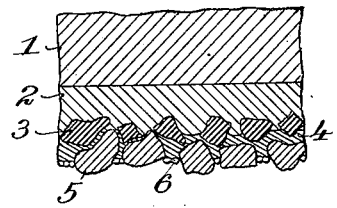
Figure 5:
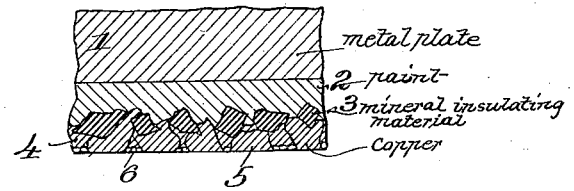

Figures 1, 2, 3, and 4 are enlarged diagrammatic sections illustrating the successive steps in the process of applying my improved antifouling coating, and Fig. 5 is a similar diagrammatic section illustrating the completed coating.

The metal 1 which is to receive the protecting-coating is first thoroughly cleansed, as by scraping and washing, before the antifouling coating is applied. I first apply to the metal a layer of suitable adhesive substance 2, herein called "paint." I prefer to make this paint of linseed-oil and varnish-gums in the proportions of forty gallons of linseed-oil to one hundred pounds of varnish-gums, and of the latter the best known to me for this purpose are kauri and Zanzibar gums. This paint may be reduced for ease of application by means of a diluent, such as turpentine or benzin, which is added until the paint is of such a consistency as to be readily laid upon the surface to be coated. It is not material to my invention that this particular paint should be employed in making my coating, as any suitable paint may be employed for this purpose. Fig. 1 illustrates the stage in the process of the application of my improved coating after the application to the surface to be covered of the layer of paint. This layer of paint is now preferably allowed to dry until it becomes tacky, and then I apply to the surface of the paint granulated, comminuted, or fibrous insulating material 3. Any suitable insulating material may be used for this purpose.

Figure 2:
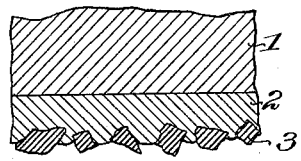

My invention in its broader aspects contemplates the use of finely-divided mineral substance, such as sand or granulated vegetable substance, such as sawdust, or manufactured insulating material, such as compressed fiber. It is to be noted, however, that when I use as the insulating material a substance liable to decomposition by contact with water or which will be swollen by the absorption of water, which sometimes accidentally finds its way through the outer surface of the coating, or when the outer layers of the coating have been accidentally abraded, I prefer to use waterproof paint in order to protect the insulating substance from the action of the water. The insulating material is applied to the tacky layer of paint by any suitable means, such as a blower, and the particles of the material are projected into the surface of the first layer of paint, as shown in Fig. 2. The first layer of paint, with the layer of insulating material adhering thereto, is now allowed to become thoroughly dry, and then I apply a second layer of paint 4, as shown in Fig. 3, which preferably is the same kind of paint as that first applied, to which coating of paint is then applied by any suitable means, such as a blower, a layer of comminuted copper 5, which adheres to the second layer of paint 4, as shown in Fig. 4. This layer of comminuted copper 5 is now rolled, hammered, or pressed into the coating of paint 4 and against the layer of insulating material 3, which latter will effectively prevent any of the comminuted copper from coming in contact with the metal to be coated, thus constituting an insulating medium between the metal to be coated and the comminuted copper and preventing to a greater or less extent electrolytic action between the two metals, which would result in corroding the metal. (See Fig. 5.) The insulating material illustrated in the drawings is finely-divided mineral substance, and, as shown in Fig. 5, the rolling, hammering, or pressing of the comminuted copper through the layer of paint 4 and against the layer of insulating material results in impaling the particles of copper upon the particles of finely-divided mineral substance, and it will be observed that by thus driving the copper upon the points and projections of the layer of finely-divided mineral substance there is effected a knitting together of the structure in a manner somewhat similar to that in which the bones in the human skull are knit together by jagged sutures. The rolling, hammering, or pressing of the comminuted copper upon the layer of insulating material not only firmly unites such layer of copper to the layer of insulating material, but it also smooths the surface of the coating and turns the particles of comminuted copper so that they will present comparatively smooth sides to the outer surface, where they will be exposed to the deteriorating action of moisture against them, whereby the salts of copper will be formed and the accumulation of marine growths thereon will be efficiently prevented.

In order to make the surface of the antifouling coating very full of particles of copper, I prefer before rolling, hammering, or pressing the layer of comminuted copper into the coating of paint 4 and the layer of insulating material thereunder first to apply by any suitable means, as by a blower, still more finely-divided comminuted copper 6, which will enter the interstices between the larger particles of comminuted copper 5 previously applied, as shown in Fig. 4, and then the surface may be finished in the same manner as above described.

This application is a companion case to my application filed of even date herewith, Serial No. 41,657.

Having thus described my invention, I claim as new and desire to secure by Letters Patent of the United States of America—

1. An antifouling coating for metal structures, composed of a layer of paint, a layer of finely-divided insulating material and a layer of comminuted copper, substantially as described.

2. An antifouling coating for metal structures, composed of a layer of paint, a layer of finely-divided insulating material, a second layer of paint and a layer of comminuted copper, substantially as described.

3. An antifouling coating for metal structures composed of a layer of paint, a layer of finely-divided insulating mineral substance embedded in the layer of paint and a layer of comminuted copper impaled upon the particles of the layer of mineral substance, substantially as described.

4. An antifouling coating for metal structures composed of a layer of paint, a layer of finely-divided insulating mineral substance adhesively attached to the surface of the said layer of paint, a second layer of paint and a layer of comminuted copper driven into the last-mentioned layer of paint and impaled upon the particles of the layer of finely-divided mineral substance, presenting a smooth surface closely studded with bare particles of copper, substantially as described.

In testimony whereof I affix my signature in presence of two witnesses.

GEORGE D. COLEMAN.

Witnesses:
HORACE VAN EVEREN,
ALFRED H. HILDRETH.